INVENTOR.

BY Albert T. Scheiwer

Patented Feb. 15, 1949

2,461,699

UNITED STATES PATENT OFFICE 2,461,699

COUPLING

Albert T. Scheiwer, Erie, Pa.

Application May 21, 1945, Serial No. 594,928

4 Claims. (Cl. 285—169)

This invention relates generally to couplings and more particularly to snap-type couplings.

Where quick connections are necessary such as an oxygen mask in an airplane, the least amount of movements with the hands is desirable. A coupling must also be handled with heavy mittens so the simplest and quickest means of making the coupling must be provided.

It is, accordingly, an object of my invention to provide a snap-type coupling which requires a minimum of handling to make a connection.

Another object of my invention is to provide a coupling which is simple in construction, efficient in operation, economical in cost, and easy to connect.

Another object of my invention is to provide a novel washer for a snap-type coupling.

Another object of my invention is to provide a coupling which is automatically and securely locked together in sealed relationship upon insertion of the male member into the female member.

Other objects of my invention will become evident from the following detailed description, taken in conjunction with the accompanying drawings, in which Fig. 1 is a side elevational view partly in section of my novel snap-type coupling.

Figure 1:
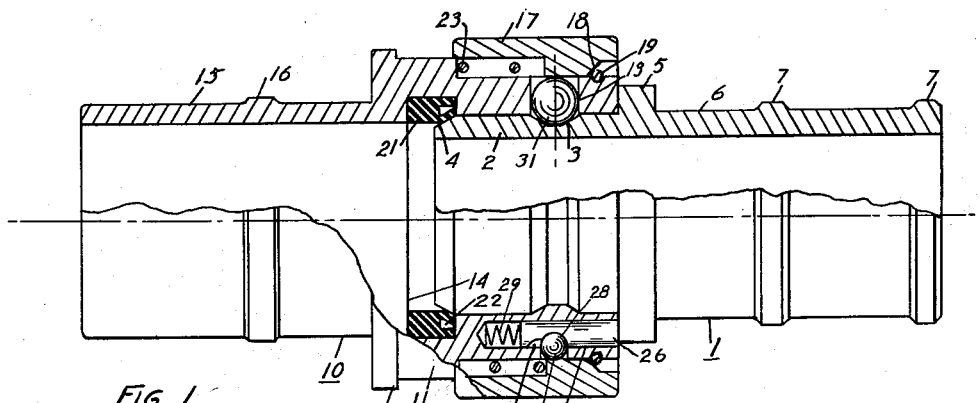

Referring now to the drawings. Figs. 1, 2, 3, and 4 show a male member 1 comprising connecting portion 2 with a groove 3 and end tapered portion 4, a shoulder 5, and a hose connecting portion 6 with peripheral shoulder 7.

A female member 10 comprises an inner sleeve 11 with a shoulder 12, ball retaining apertures 13, an inner annular groove 14 and a hose connecting portion 15 with a peripheral shoulder 16; and an outer longitudinally movable, generally L-shaped sleeve 17 with a tapered camming portion 18 urged toward the spring clip 19 disposed in a groove 20 in the sleeve 11. A washer 21 has an annular groove 22 and is disposed in the annular groove 14 in the sleeve 11. The sleeve 11 has longitudinally extending apertures 25 for receiving pins 26 having transverse grooves 27 and 28 of varying depths and urged outwardly by a spring 29. Ball members 30 are disposed in the deep groove 28 when the male and female members 1 and 10 are connected together as shown in Fig. 1 wherein the camming portion 18 of the movable sleeve 17 clears the ball members 30 when moved longitudinally. When the movable sleeve 17 is moved longitudinally against the force of a spring 23, the springs 29 move the pins 26 outwardly to the position shown in Fig. 2 and the ball members 30 are forced into the shallow grooves 27 and, therefore, are moved radially outwardly into the path of the camming portion 18 of the movable sleeve 17 to hold it in the position shown in Fig. 2. The inner diameter of the sleeve 11 adjacent the grooved portion 22 of the washer 21 is greater than the inner diameter of the washer 21 so that the inside portion of the washer 21 adjacent the groove 22 is forced outwardly by the tapered end portion 4 of the connecting portion 2 of the male member 1 to provide a perfect fluid seal. Ball members 31 are disposed in the apertures 13 in the sleeve 11 to engage the groove 3 in the connecting portion 2 of the male member 1 to secure the male and female mmbers 1 and 10 together.

In operation, the movable sleeve 17 is normally held in a retarded position by the ball members 30 which in turn are held outwardly by the shallow grooves 27 in the pins 26 when the male and female members 1 and 10 are disconnected. When the connecting portion 2 of the male member 1 is inserted into the female member 10, the shoulder 5 on the male member 1 engages the pins 26 and forces them inwardly to a position shown in Fig. 1 where the ball members 30 move into the deep grooves 28 and permit the longitudinal movement of the movable sleeve 17 to force the ball members 31 into locking engagement with groove 3 on the connecting portion 2 of the male member 1. The inside portion of the washer 21 adjacent the groove 22 therein is forced outwardly by the tapered end portion 4 of the connecting portion 2 of the male member 1.

Figure 2:
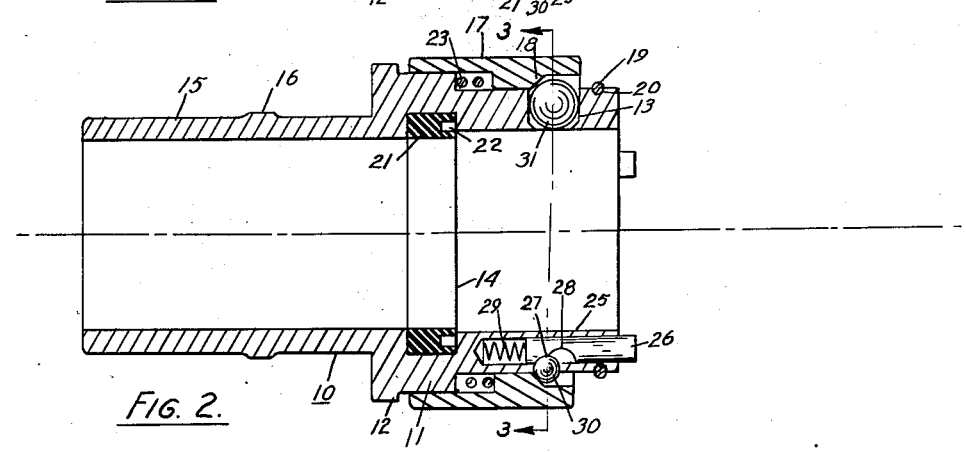
Fig. 2 is a longitudinal vertical sectional view of the female member of my novel snap-type coupling when the male and female members are disconnected.
Figures 3, 4:
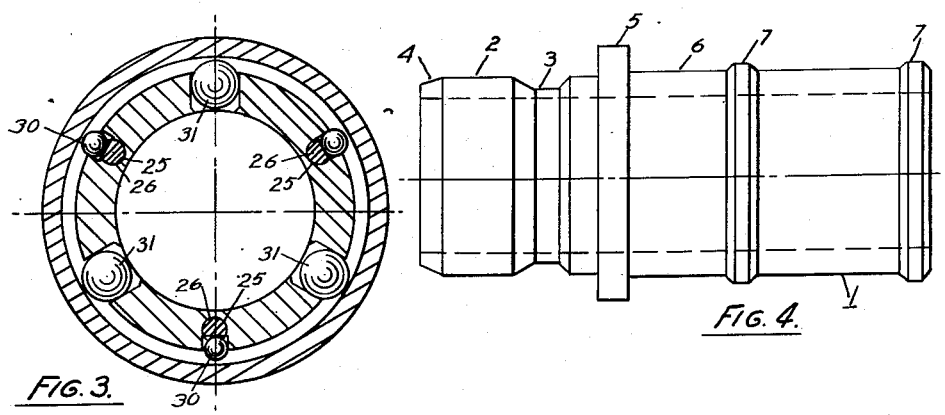
Fig. 3 is a view taken on the line 3—3 of Fig. 2.
Fig. 4 is a side elevational view of the male member of my novel snap-type coupling.

For disconnection of my novel coupling, the movable sleeve 17 is moved against the force of the spring 23 to a position shown in Fig. 2 to free the ball members 31 and, therefore, the male member 1. In this position, the springs 29 force the pins 26 outwardly and the ball members 30 are forced outwardly by a camming action into the shallow groove 27 and into the path of the camming portion 18 of the movable sleeve 17 to hold the movable sleeve 17 in the position shown in Fig. 2.

It will be evident from the foregoing that I have provided a snap-type coupling which can be effectively locked by merely inserting the male member in the female member and a novel washer which effectively seals the coupling member.

Various changes may be made in the specific embodiment of my invention without departing from the spirit thereof, or from the scope of the appended claims.

What I claim is:

1. A coupling comprising a male member having a connecting portion with a peripheral groove; and a female member comprising an inner sleeve, camming members carried by said inner sleeve, an outer movable sleeve for forcing said camming members into engagement with the groove in said connecting portion of said male member to secure said male and female members together, longitudinally movable pins in said inner sleeve having camming portions, and camming members adapted to be forced outwardly by the camming portion of said pins when said movable sleeve is moved to an unlocking position.

2. A coupling as set forth in claim 1 wherein said camming members are ball members.

3. A coupling comprising a male member having a connecting portion with a groove; and a female member comprising an inner sleeve, locking ball members carried by said inner sleeve, a locking sleeve having a camming portion for locking said ball members in engagement with the groove in the connecting portion of said male member, longitudinally movable camming members in said inner sleeve, adapted to be engaged by said male member, and a second set of ball members carried by said inner sleeve engaged by said camming members when said female member is disconnected to hold said locking sleeve out of engagement with said locking ball members.

4. A coupling comprising a male member having a shoulder and a connecting portion with a groove; and a female member comprising an inner sleeve with radially and longitudinally extending apertures, ball members disposed in said radially extending apertures, a locking sleeve for locking said ball members in engagement with the groove in said connecting portion of said male member to secure said male and female members together, and pins having camming portions disposed in said longitudinal apertures, and ball members disposed in radially extending apertures of said sleeve adapted to be engaged by the camming portion of said pins when said female member is disconnected, to hold said locking sleeve out of engagement with said locking ball member, said pins being engageable by the shoulder of said male member when said male member is inserted into said female member to move said ball members out of engagement with said locking sleeve.

ALBERT T. SCHEIWER.

REFERENCES CITED

The following references are of record in the file of this patent:

UNITED STATES PATENTS

| Number | Name | Date |
|---|---|---|
| 1,417,411 | Reynolds | May 23, 1922 |
| 2,135,221 | Scheiwer | Nov. 1, 1938 |
| 2,165,052 | Hering | July 4, 1939 |
| 2,279,146 | Schneller | Apr. 7, 1942 |